(12) United States Patent
Arcese et al.

(10) Patent No.: US 9,354,920 B2
(45) Date of Patent: May 31, 2016

(54) MANAGING VIRTUAL APPLIANCES SUPPORTING MULTIPLE PROFILES

(71) Applicant: International Business Machines Corporation, Armonk, NY (US)

(72) Inventors: Mauro Arcese, Rome (IT); Giuseppe Ciano, Rome (IT); Francesca Curzi, Rome (IT); Claudio Marinelli, Rome (IT); Luigi Pichetti, Rome (IT)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/497,104

(22) Filed: Sep. 25, 2014

(65) Prior Publication Data

US 2015/0113530 A1 Apr. 23, 2015

(30) Foreign Application Priority Data

Oct. 22, 2013 (GB) .................................. 1318608.5

(51) Int. Cl.
  *G06F 9/45* (2006.01)
  *G06F 9/455* (2006.01)
  *G06F 9/445* (2006.01)
(52) U.S. Cl.
  CPC .............. *G06F 9/45558* (2013.01); *G06F 8/60* (2013.01)
(58) Field of Classification Search
  None
  See application file for complete search history.

(56) References Cited

U.S. PATENT DOCUMENTS

| 8,209,288 B2 | 6/2012 | Friedman et al. |
| 8,839,246 B2 * | 9/2014 | Fitzgerald ............... G06F 9/455 717/173 |

(Continued)

FOREIGN PATENT DOCUMENTS

EP 2084605 A2 8/2009

OTHER PUBLICATIONS

Search Report under 17(5) dated Mar. 24, 2014, Application No. GB1318608.5, 5 pages.

(Continued)

*Primary Examiner* — Chuck Kendall
(74) *Attorney, Agent, or Firm* — Francis Lammes; Stephen J. Walder, Jr.; Diana R. Gerhardt (57) ABSTRACT

A mechanism is provided for managing one or more virtual appliances on a computing system. For a specific virtual appliance, profile information indicative of a set of profiles of the specific virtual appliance is retrieved, status information indicative of a status of the computing system is retrieved, and constraint information indicative of one or more constraints applicable to one or more software programs of the specific virtual appliance on the computing system is retrieved. A determination is made of a configuration scheme of the specific virtual appliance according to the profile information, the status information, and the constraint information. The configuration scheme a specific profile of the set of profiles of the specific virtual appliance having the one or more software programs thereof compliant with the applicable constraints. The specific virtual appliance is configured according to the configuration scheme.

18 Claims, 6 Drawing Sheets

(56) References Cited

U.S. PATENT DOCUMENTS

| | | |
|---|---|---|
| 2009/0249329 A1 | 10/2009 | Dash |
| 2010/0306773 A1 | 12/2010 | Lee et al. |
| 2011/0072431 A1 | 3/2011 | Cable et al. |
| 2012/0131578 A1 | 5/2012 | Ciano et al. |
| 2012/0284380 A1 | 11/2012 | Anderson, III et al. |
| 2013/0014111 A1 | 1/2013 | Ciano et al. |
| 2013/0061226 A1 | 3/2013 | Ammons et al. |
| 2013/0124353 A1 | 5/2013 | Dhoolia et al. |

OTHER PUBLICATIONS

"Method and System for deployment of a complex virtual appliance in a cloud computing environment based on an image personality assigned dynamically at provisioning time", Disclosed Anonymously, www.ip.com, IPCOM000228183D, Jun. 11, 2013, 4 pages.

"Method and System for managing in a dynamic way the personalities for complex virtual appliances in a cloud computing environment", Disclosed Anonymously, www.ip.com, IPCOM000224960D, Jan. 16, 2013, 4 pages.

"Processor Value Unit [PVU] licensing for Distributed Software", IBM Corporation, http://www-01.ibm.com/software/passportadvantaage/pvu_licensing_for_customers.html, Jul. 23, 2014, 4 pages.

Armstrong, Django et al., "Towards a Contextualization Solution for Cloud Platform Services", 2011 Third IEEE International Conference on Cloud Computing Technology and Science, Athens, Nov. 29-Dec. 1, 2011, pp. 328-331.

Kim, Minkyong et al., "Management-Based License Discovery for the Cloud", Tenth International Conference on Service Oriented Computing (ICSOC 2012), Shanghai, China, Nov. 12-15, 2012, pp. 499-506.

* cited by examiner

MANAGING VIRTUAL APPLIANCES SUPPORTING MULTIPLE PROFILES

BACKGROUND

The present disclosure relates to the information technology field. More specifically, this disclosure relates to the management of virtual appliances.

Virtual appliances (VA) are a specific type of software appliances. In general, a software appliance is a software solution for performing a specific user task; for this purpose, the software appliance comprises a set of software programs implementing the user task, which are encapsulated in a pre-built, self-contained deployment package. Particularly, a virtual appliance is a software appliance designed to run in a virtualized environment; more specifically, the virtual appliance comprises one or more virtual (computing) machines (VM)—i.e., emulations by software of physical computing machines; each virtual machine runs one or more application programs (actually implementing the user task) and an operating system supporting them—for example, a Just Enough Operating System (JeOS), consisting of a limited operating system specifically tailored for the corresponding application programs. The virtual appliances provide a simplified management (i.e., development, deployment and maintenance). This is particularly advantageous in cloud computing environments providing access to computing resources on-demand as services (i.e., self-contained basic tasks that may be invoked through a well-defined interface); indeed, in this case the virtual appliances allow provisioning the corresponding services in a very simple and fast way.

Each virtual appliance may also support multiple profiles (in jargon, personalities). Each profile is defined by a corresponding set of all the software programs (i.e., operating system and application programs) that are available in the virtual appliance; when a specific profile is activated, only the corresponding software programs are enabled (while the other software programs are kept disabled). In this way, it is possible to manage a reduce number of virtual appliances, which may be used in different ways according to contingent needs; for example, a virtual appliance implementing a web service may support a profile with a proprietary web server and another profile with an open source web server.

The virtual appliances are becoming more and more complex; for example, the above-mentioned virtual appliance implementing a web service may have a web tier (providing its user interface), an application tier (providing its processing logic) and a back-end tier (providing its data storing), with each tier comprising multiple virtual machines. However, this complexity is challenging for the management of specific constraints that may be applicable to the software programs—for example, their compliance with license entitlements. This is exacerbated in cloud computing environments, wherein a high number of heterogeneous virtual appliances are continually deployed and deleted; moreover, further difficulties are caused by the large variety of license conditions that are offered by different vendors of the software programs.

Some techniques have been proposed in the art for coping with this problem.

For example, EP-A-2084605 (the entire disclosure of which is herein incorporated by reference) discloses a technique wherein compliance of a virtual machine with a compliance scheme is determined prior to its execution; if the virtual machine is not compliant, it is adapted into compliance pre-execution, and adaptations made to the virtual machine are analyzed to derive an optimized variant of the virtual machine based on the analysis. For example, non-compliances that may be fixed comprise missing security software, bug-fixes and hot-fixes, configuration and licensing issues (such as removal/flagging of unauthorized software).

Moreover, US-A-2009/0249329 (the entire disclosure of which is herein incorporated by reference) discloses a technique wherein a deployment scheme of a new virtual appliance to be deployed on a data processing center is determined by optimizing a cost function based on license condition information applicable to the data processing center, configuration information of the data processing center and structure information of the new virtual appliance.

However, the techniques known in the art only operate at the level of the virtual machines; in other words, they work in an on-off way, permitting or prohibiting the use of each virtual machine according to its whole compliance (with at most the possibility of removing/flagging unauthorized software).

SUMMARY

In one illustrative embodiment, a method, in a data processing system, is provided for managing one or more virtual appliances on a computing system, In the illustrative embodiment, each virtual appliance of the one or more virtual appliances comprises one or more virtual machines, each virtual machine of the one or more virtual machines comprises one or more software programs and supporting a plurality of profiles, and each profile in the plurality of profiles involves an enabling of a corresponding set of one or more of the software programs with each other software program being disabled. For at least a specific virtual appliance of the one or more virtual appliances, the illustrative embodiment retrieves profile information indicative of a set of profiles of the specific virtual appliance. The illustrative embodiment retrieves status information indicative of a status of the computing system. The illustrative embodiment retrieves constraint information indicative of one or more constraints applicable to the one or more software programs of the specific virtual appliance on the computing system. The illustrative embodiment determines a configuration scheme of the specific virtual appliance according to the profile information, the status information, and the constraint information, the configuration scheme involving a specific profile of the set of profiles of the specific virtual appliance having the one or more software programs thereof compliant with the one or more constraints applicable to the one or more software programs of the specific virtual appliance on the computing system. Lastly, the illustrative embodiment configures the specific virtual appliance according to the configuration scheme.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The solution of the present disclosure, as well as further features and the advantages thereof, will be best understood with reference to the following detailed description, given purely by way of a non-restrictive indication, to be read in conjunction with the accompanying drawings (wherein, for the sake of simplicity, corresponding elements are denoted with equal or similar references and their explanation is not repeated, and the name of each entity is generally used to denote both its type and its attributes—such as value, content and representation).

Particularly.

DETAILED DESCRIPTION

Figure 1:
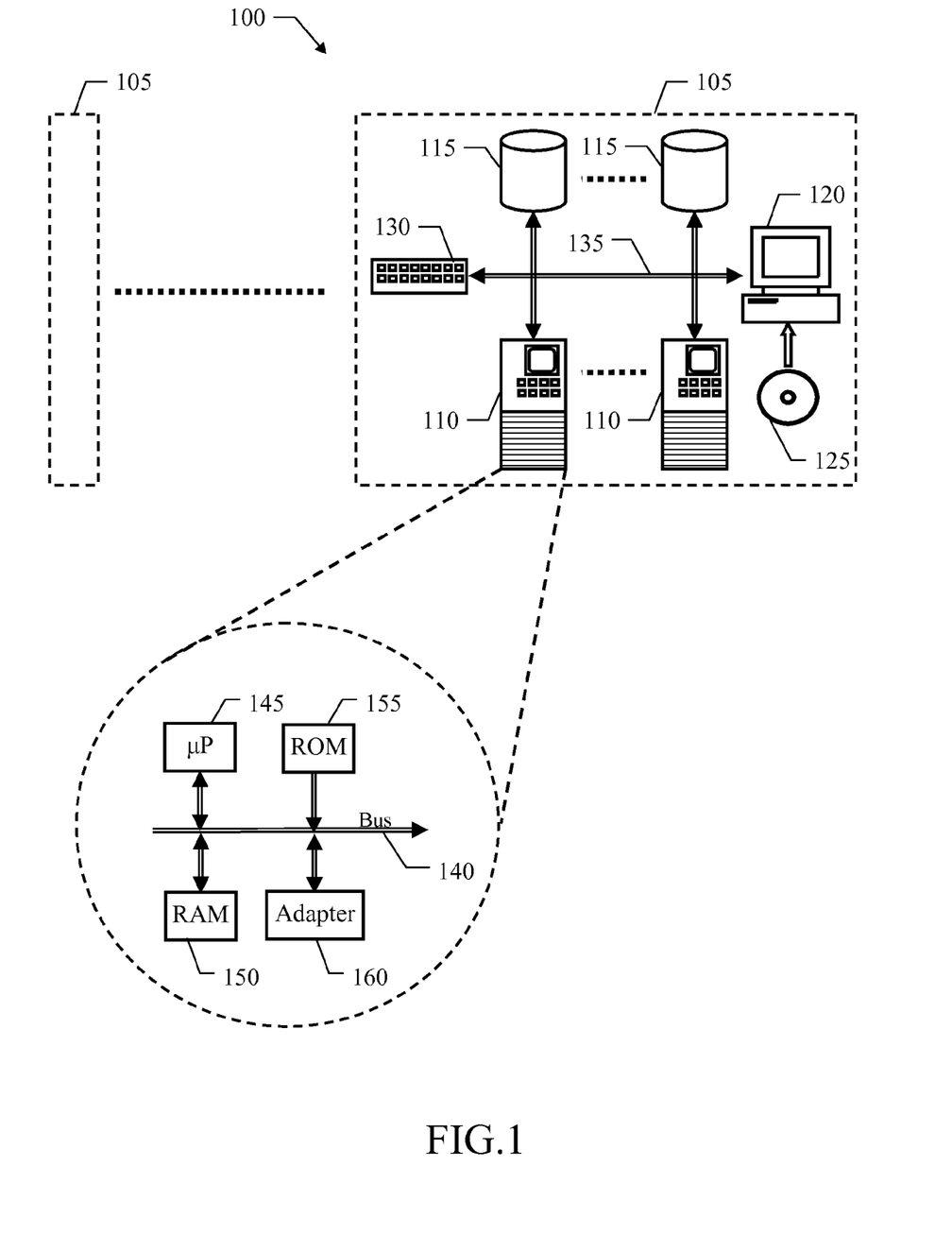
FIG. 1 shows a schematic block-diagram of a computing system wherein the solution according to an embodiment of the present disclosure may be applied.

With reference in particular to the FIG. 1, a schematic block-diagram is shown of a computing system 100 wherein the solution according to an embodiment of the present disclosure may be applied.

The computing system 100 is a cloud infrastructure, which comprises one or more cloud nodes that make available (virtual) cloud resources on-demand as cloud services according to several service models, such as Infrastructure as a Service (IaaS), Platform as a Service (PaaS), Software As a Service (SAS) or Network as a service (NaaS). The cloud services are made available by corresponding cloud providers according to different deployment models, such as public cloud, private cloud, community cloud or hybrid cloud. Several users may access the cloud infrastructure 100 by connecting to it with a corresponding client computing machine through a communication network (not shown in the figure), such as the Internet in a public/community cloud or a LAN in a private cloud; each user has the sole control of his/her cloud resources, which may then be used exactly as if they were dedicated physical resources. For this purpose, each cloud node exposes a front-end (which may be accessed, for example, via a web browser or a mobile app); on the contrary, a back-end of the cloud node actually providing the cloud resources is completely opaque to the users.

Generally, the cloud nodes are implemented by one or more server farms 105 that are loosely coupled, with a redundant architecture to ensure a sufficient reliability level. Each server farm 105 comprises several server computing machines, or simply servers, 110 (for example, of the rack or blade type), and several storage disks 115 (for example, of the RAID type) implementing mass-memories of the servers 110; the server farm 105 also comprises a console 120 for controlling the servers 110 and the disks 115 (for example, a personal computer, also provided with a drive for reading removable storage devices, such as DVDs 125). A switch/router sub-system 130 manages any communications among the servers 110, the disks 115 and the console 120, and with the communication network; for this purpose, the servers 110, the disks 115 and the console 120 are connected to the switch/router sub-system 130 through a cabling sub-system 135.

Each server 110 is formed by several units that are connected in parallel to a bus structure 140. In detail, one or more microprocessors (μP) 145 control operation of the server 110; a RAM 150 is directly used as a working memory by the microprocessors 145, and a ROM 155 stores basic code for a bootstrap of the server 110. Moreover, the server 110 comprises a network adapter 160, which is used to connect the server 110 to the cabling sub-system 135.

Figure 2:
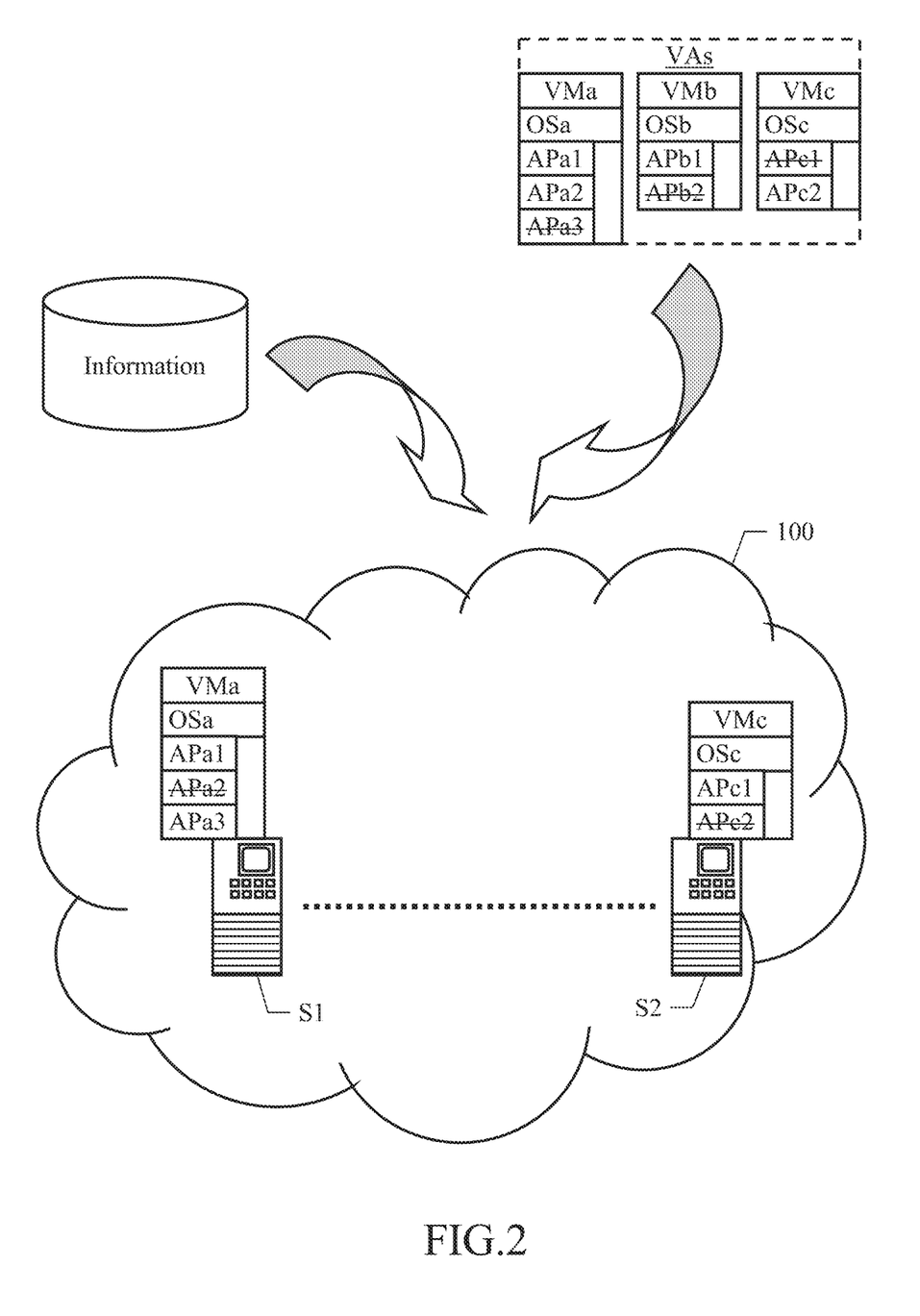
FIG. 2 shows a pictorial representation of an exemplary application of the solution according to an embodiment of the present disclosure.

With reference now to the FIG. 2, a pictorial representation is shown of an exemplary application of the solution according to an embodiment of the present disclosure.

Particularly, this solution allows managing one or more virtual appliances on a computing system (for example, the above-described cloud infrastructure 100). Each virtual appliance comprises one or more virtual machines (hosted on one or more servers of the cloud infrastructure 100, each one provided with a hypervisor that emulates a virtual operating platform); in turn, each virtual machine comprises one or more operating systems and application programs. The virtual appliance supports a plurality of profiles, each one involving the enabling of a corresponding set of the software programs (i.e., operating system and application programs) of its virtual machines.

For example, a specific virtual appliance VAs (either a new virtual appliance to be deployed or an active virtual appliance already instantiated on the cloud infrastructure 100) comprises three virtual machines VMa, VMb and VMc; the virtual machine VMa comprises an operating system OSa and three application programs APa1, APa2, APa3, the virtual machine VMb comprises an operating system OSb and two application programs APb1, APb2, and the virtual machine VMc comprises an operating system OSc and two application programs APc1, APc2. The virtual appliance VAs supports a profile P1 (comprising the virtual machine VMa with the software programs OSa, APa1, APa2, the virtual machine VMb with the software programs OSb, APb1 and the virtual machine VMc with the software programs OSc, APc2) and a profile P2 (comprising the virtual machine VMa with the software programs OSa, APa1, APa3 and the virtual machine VMc with the software programs OSc, APc1); one of these profiles (for example, the profile P1) has been selected for deploying the new virtual appliance or it has been activated on the active virtual appliance.

Profile information indicative of the profiles of the virtual appliance VAs (for example, its virtual machines and software programs), status information indicative of a status of the cloud infrastructure 100 (for example, its servers and active virtual appliances) and constraint information indicative of one or more constraints applicable to the software programs of the virtual appliance VAs on the cloud infrastructure 100 (for example, available license entitlements and required service levels) is retrieved, for example, from corresponding repositories. A configuration scheme of the virtual appliance VAs is determined according to the profile information, the status information and the constraint information; the configuration scheme involves a specific profile of the virtual appliance VAs having its software programs that are compliant with the applicable constraints. The virtual appliance VAs is then configured according to the configuration scheme (for example, by deploying the new virtual appliance or updating the active virtual appliance accordingly). Particularly, the configuration scheme may determine a change of the profile of the virtual appliance VAs and/or of characteristics of its virtual machines (such as the servers of the cloud infrastructure 100 hosting them); for example, the configuration scheme may determine the activation of the specific profile P2, with the virtual machine VMa that is hosted on a server S1 (with only the software programs OSa, AP1, APa3 that are enabled) and the virtual machine VMc that is hosted on a server S2 (with only the software programs OSc, APc1 that are enabled).

The above-described solution operates at the level of the profiles of the virtual appliance.

In this way, the applicable constraints are enforced only against the software programs of the specific profile (i.e., the software programs that are actually enabled), whereas the other software programs that are kept disabled are not taken into account.

As a result, it is possible to provide a single virtual appliance with a number of software programs defining different profiles thereof; any profile may be activated each time, so as to ensure the compliance of the virtual appliance according to the enabled software programs, irrespectively of the other software programs that are kept disabled.

All of the above dramatically simplifies the management of the virtual appliances; particularly, this reduces an overhead (from both a resource and startup perspective) with respect to the use of multiple virtual appliances corresponding to the profiles of each virtual appliance. The above-mentioned advantages are especially perceived in cloud computing environments, wherein they allow provisioning corresponding services in a very simple and fast way.

Figure 3:
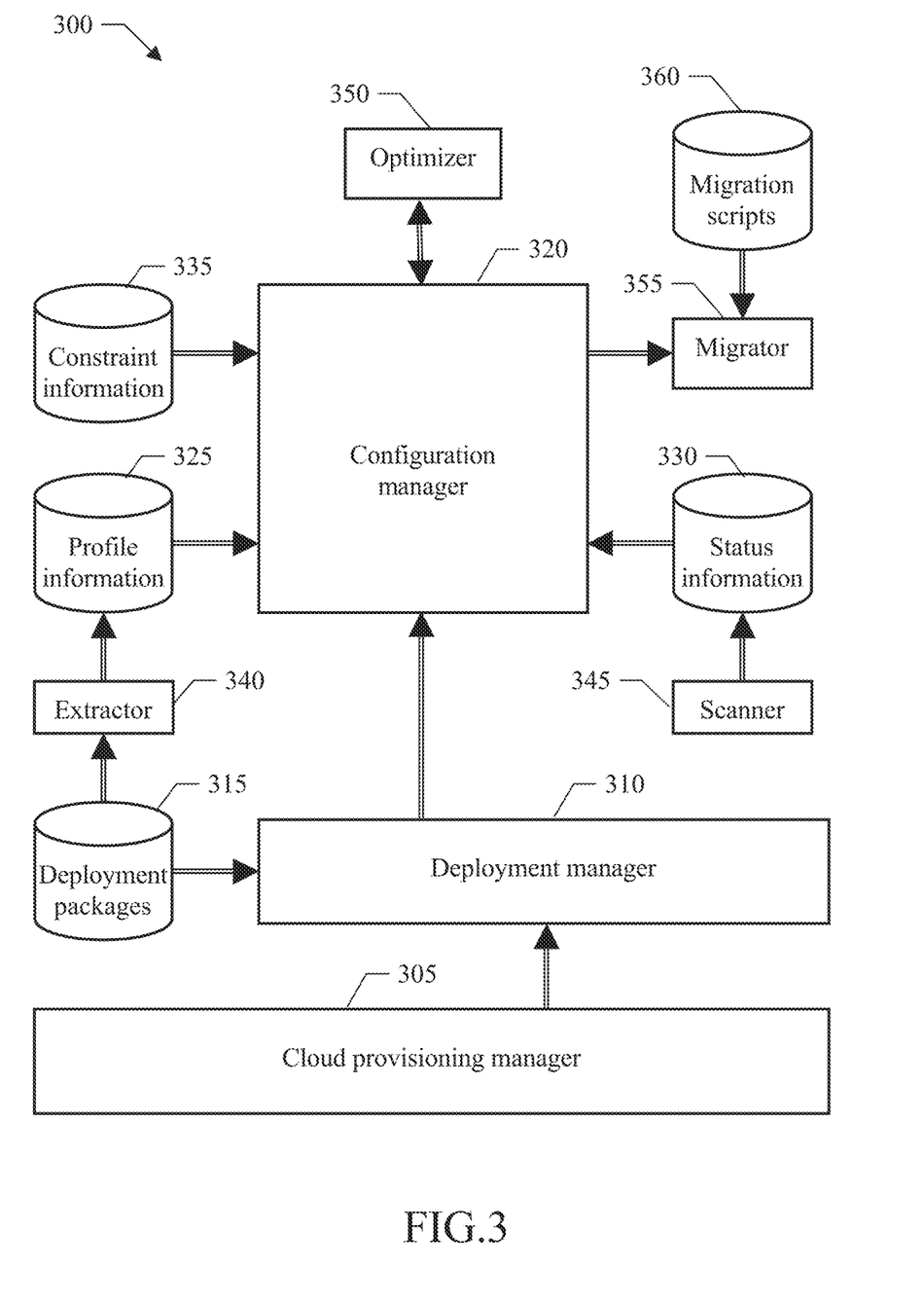
FIG. 3 shows the main software components that may be used to implement the solution according to an embodiment of the present disclosure.

With reference now to the FIG. 3, the main software components are shown that may be used to implement the solution according to an embodiment of the present disclosure.

These software components (programs and data) are denoted as a whole with the reference 300. The software components are typically stored in the mass memory and loaded (at least partially) into the working memory of one or more (physical or virtual) servers of the above-described cloud infrastructure when the programs are running. The programs are initially installed onto the mass memory, for example, from removable storage devices or from the communication network. In this respect, each software component may represent a module, segment or portion of code, which comprises one or more executable instructions for implementing the specified logical function.

Particularly, a cloud provisioning manager 305 (for example, the IBM SmartCloud Provisioning by IBM Corporation, trademarks thereof) is used to provision cloud resources on-demand (according to the requests of the users of the cloud infrastructure). For this purpose, the cloud provisioning manager 305 leverages a deployment manager 310 (for example, the IBM Workload Deployer by IBM Corporation, trademarks thereof), which manages the deployment of virtual appliances on the cloud infrastructure. The deployment manager 310 accesses a deployment package repository 315 that stores the deployment packages of all the virtual appliances that are available for this purpose. Generally, each deployment package—for example, in the Open Virtualization Format (OVF)—comprises a deployment descriptor describing the corresponding virtual appliance and its virtual machines, and software images representing a content of their mass memories (in addition to optional auxiliary files, such as certificates and manifests); moreover, the deployment package comprises a plurality of activation scripts, each one for activating a corresponding profile of the virtual appliance.

In the solution according to an embodiment of the present disclosure, the deployment manager 310 interacts with a configuration manager 320 that manages the above-mentioned configuration schemes of the virtual appliances on the cloud infrastructure. For this purpose, the configuration manager 320 accesses a profile repository 325, a status repository 330 and a constraint repository 335.

The profile repository 325 stores the profile information of each known virtual appliance (for example, previously deployed on the cloud infrastructure). Particularly, the profile information indicates the virtual machines of the virtual appliance, and for each virtual machine its software programs; moreover, the profile information indicates the profiles that are supported by the virtual appliance, each one in terms of its software programs to be enabled on the virtual machines. The profile repository 325 is maintained by an extractor 340, which accesses the deployment package repository 315.

The status repository 330 stores the status information of the cloud infrastructure. Particularly, the status information indicates the servers of the cloud infrastructure and their physical resources (for example, number of microprocessors and working/mass memory capacity) and the active virtual appliances that are instantiated thereon; for each active virtual appliance, the status information indicates the corresponding virtual machines and their characteristics (for example, the server where each virtual machine is hosted and the virtual resources that are assigned thereto), and its active profile that has been activated (with the corresponding enabled software programs). The status repository 330 is maintained by a scanner 345, which interacts with the hypervisors of the servers (not shown in the figure).

The constraint repository 335 stores the constraint information of all the software programs that may be enabled on the cloud infrastructure. For example, the constraint information indicates usage entitlements (such as license entitlements) that are available for the software programs; typically, the license entitlements are defined in license agreements of the software programs that have been acquired by the cloud provider (for example, specifying a maximum number of instances of each software program that may be enabled at the same time on the cloud infrastructure, a maximum amount of physical/virtual resources that may be allocated to each one of them). In addition or in alternative, the constraint information indicates service levels that are required to the services that may be provided on the cloud infrastructure by the virtual appliances; typically, the service levels are defined in Service Level Agreements (SLAs) that have been negotiated between the users and the cloud provider, in terms of one or more target metrics to be met by the services (such as a maximum response time). Moreover, the constraint information may indicate cost schemes (for example, license conditions) of the software programs; for example, the license conditions are defined in license agreements that are offered by the vendors of the software programs (for example, charging the usage of the software programs according to an amount of physical/virtual resources that are allocated thereto).

The configuration manager 320 leverages an optimizer 350, which is used to optimize the configuration scheme of each specific virtual appliance according to the license conditions. Moreover, the configuration manager 320 leverages a migrator 355, which is used to migrate each active virtual appliance to a different profile. For this purpose, the migrator 355 accesses a migration repository 360 that stores a migration script for each pair of (source and target) profiles of each virtual appliance.

Figure 4A:
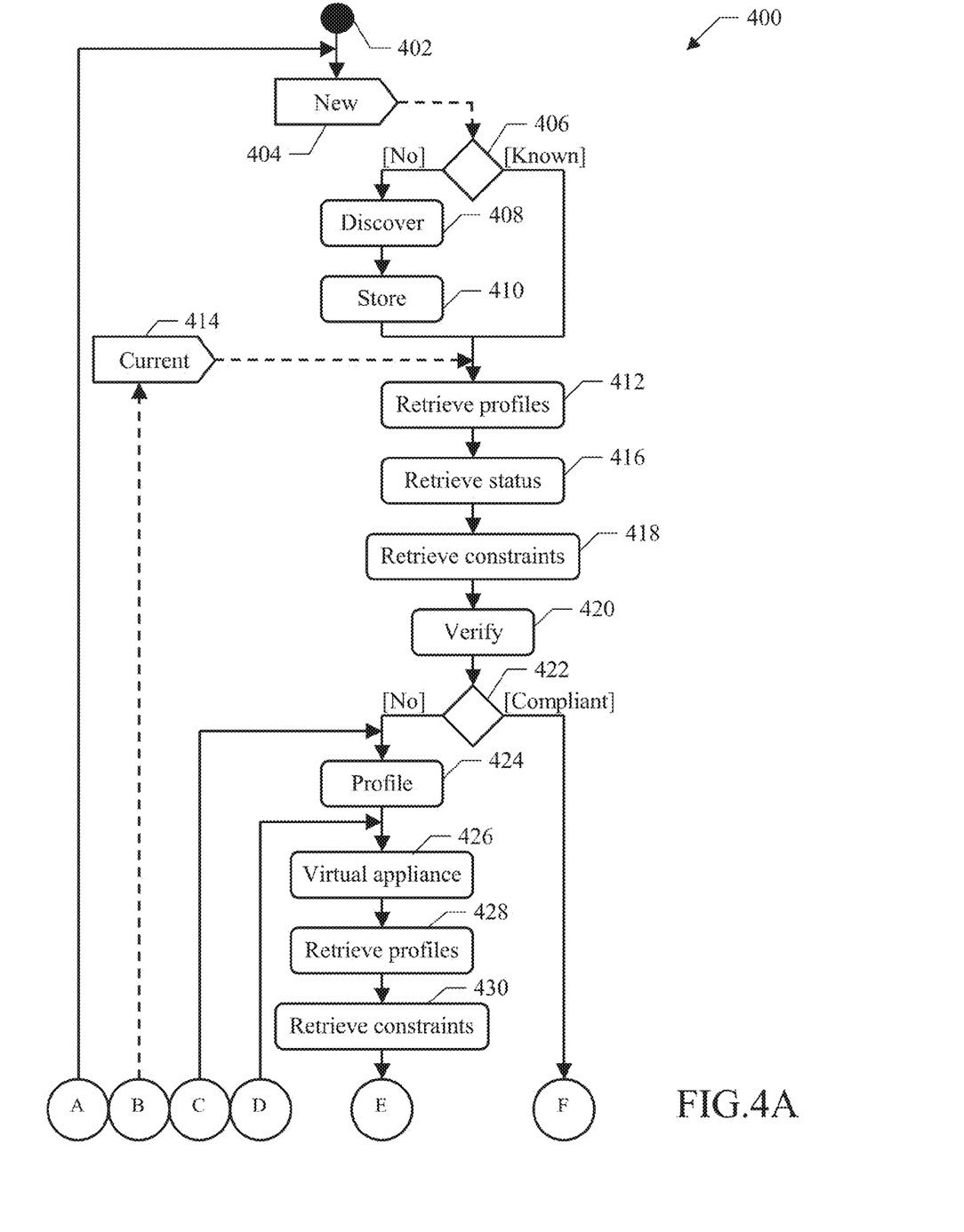
FIG. 4A-FIG. 4C show an activity diagram describing the flow of activities relating to an implementation of the solution according to an embodiment of the present disclosure.
Figure 4B:
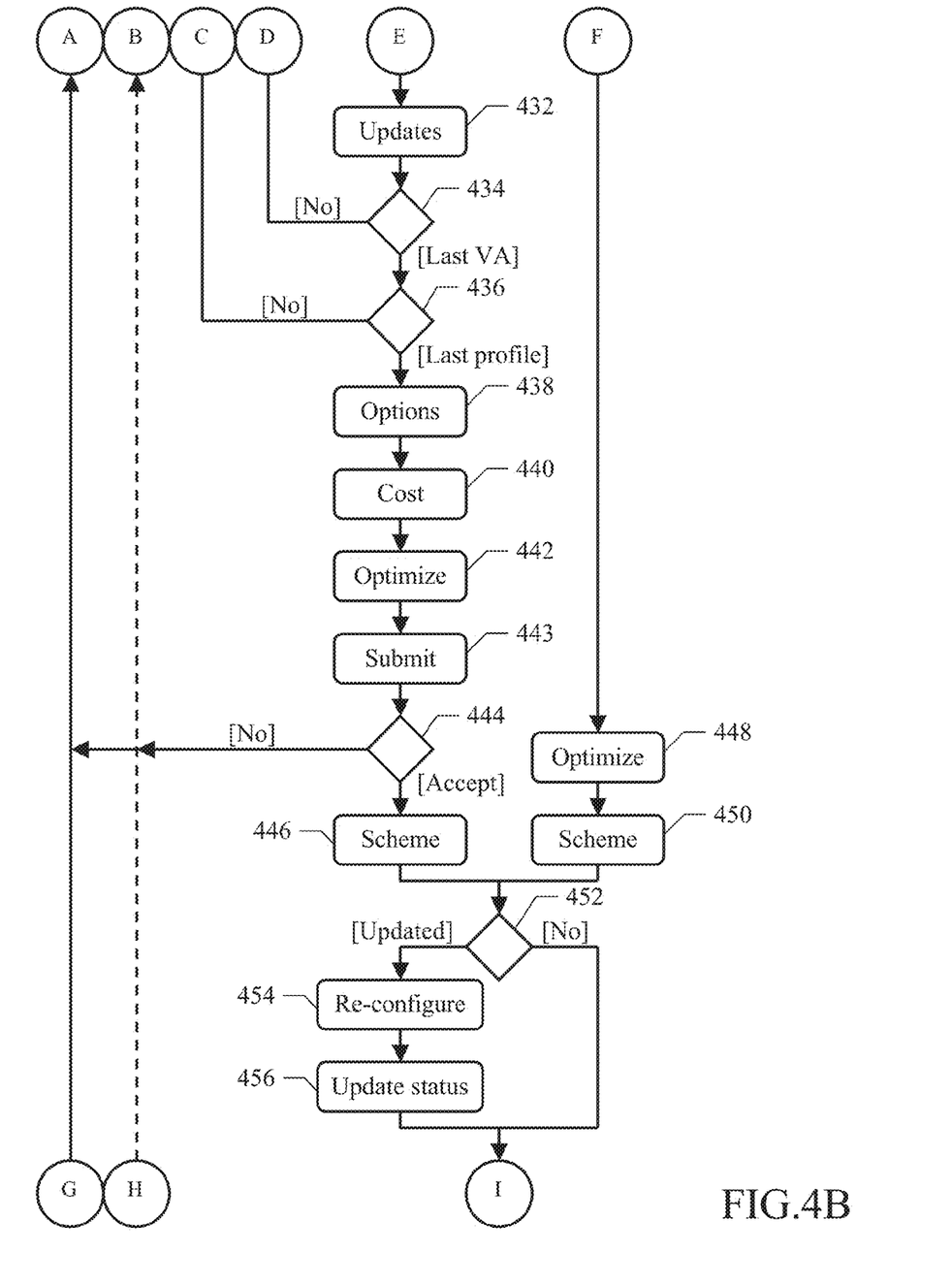
Figure 4C:
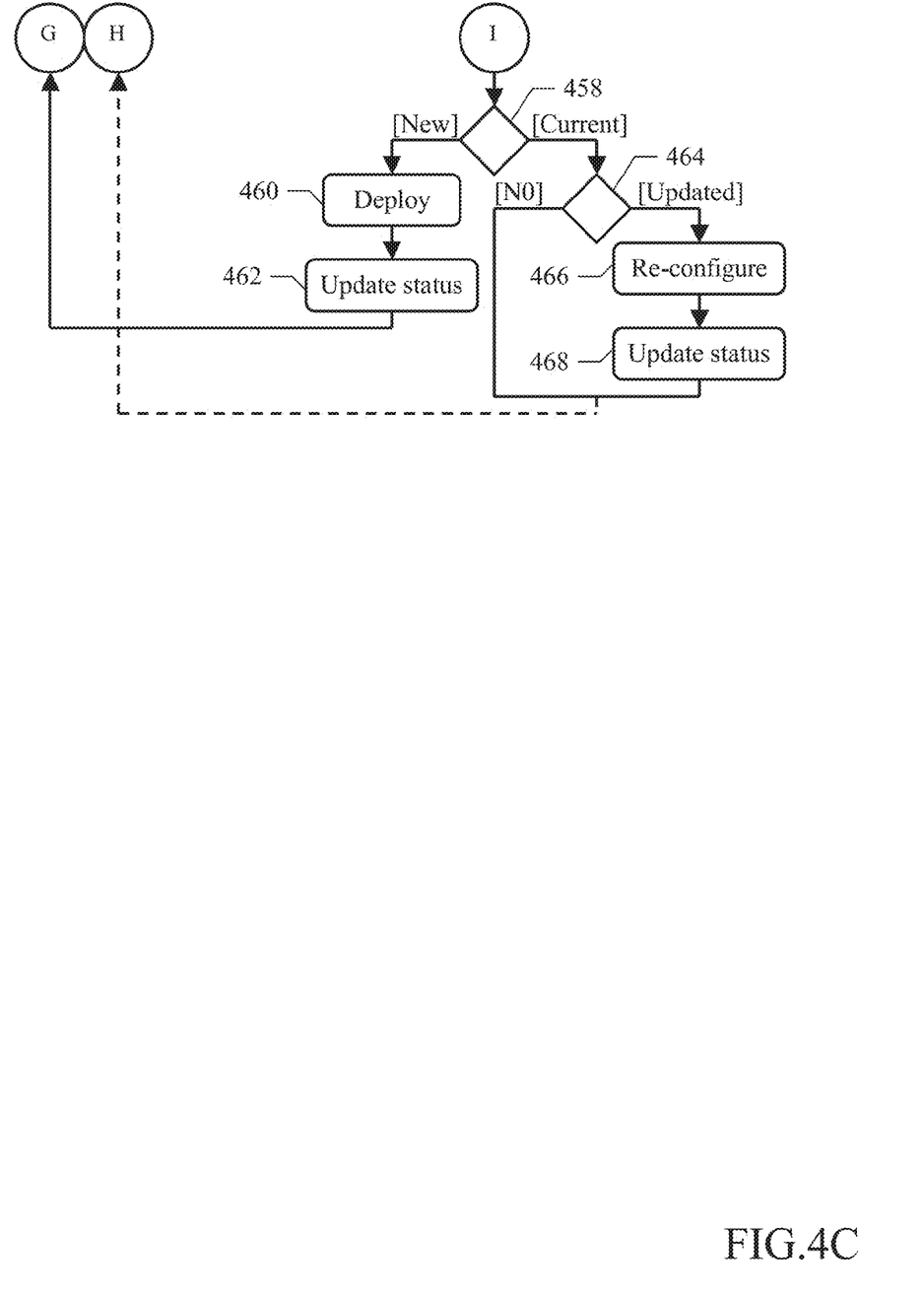

With reference now to the FIG. 4A-4C, an activity diagram is shown describing the flow of activities relating to an implementation of the solution according to an embodiment of the present disclosure.

Particularly, the diagram represents an exemplary process that may be used to manage the virtual appliances on the cloud infrastructure with a method 400. In this respect, each block may represent one or more executable instructions for implementing the specified logical function on one or more (physical or virtual) servers.

The method 400 begins at black start circle 402 and then it passes to block 404 as soon as a request for deploying a new virtual appliance with a selected new profile is received. In response thereto, a test is made at block 406 to verify whether the profile information of the new virtual appliance is available in the profile repository. If not (for example, when this is the first time that an instance of the new virtual appliance is deployed on the cloud infrastructure), the profile information is discovered at block 408 (for example, by extracting it from the deployment descriptor of its deployment package). Continuing to block 410, an entry for the new virtual appliance is added to the profile repository, and the corresponding profile information is stored therein. The flow of activity then proceeds to block 412; the same point is also reached directly from the block 406 when the profile information of the new virtual appliance is already available in the profile repository (for example, when an instance of the new virtual appliance has been deployed on the cloud infrastructure previously). Moreover, the process 400 may reach the block 412 directly from block 414 when an active virtual appliance that is already instantiated on the cloud infrastructure with an active profile has to be verified (for example, periodically every 1-5 days).

In any case, the profile information of the new virtual appliance or of the active virtual appliance (generically referred to as specific virtual appliance) is retrieved at block 412 from the profile repository (if necessary). The status information of the cloud infrastructure is then retrieved at block 416 from the status information. Moreover, the constraint information of the specific virtual appliance is retrieved at block 418 from the constraint repository.

With reference now to block 420, the profile information relating to the new profile or to the active profile of the specific virtual appliance (generically referred to as specific profile) is verified against the status information and the constraint information. The flow of activity branches at block 422 according to a result of this verification. Particularly, if one or more of the software programs of the specific profile (as indicated in the profile information) are not compliant with the applicable constraints (as indicated in the constraint information) according to the status of the cloud infrastructure (as indicated in the status information), a loop is entered for analyzing the other profiles of the specific virtual appliance and the other active virtual appliances; the loop begins at block 424 for a (selected) one of the profiles of the specific virtual appliance (starting from the first one). An inner loop is then entered at block 426 for each one of the active virtual appliances (starting from the first one). The profile information of the active virtual appliance is retrieved from the profile repository at block 428. Moreover, the constraint information of the active virtual appliance is retrieved at block 430 from the constraint repository. Continuing to block 432, there are determined the software programs of the selected profile of the specific virtual appliance that are complaint with the applicable constraints; moreover, there is verified whether the specific virtual appliance may be updated (without changing the selected profile) and/or the active virtual appliance may be updated (either changing or not its active profile) to make one or more of the software programs of the selected profile of the specific virtual appliance compliant with the applicable constraints (at the same time maintaining the active virtual appliance compliant with the applicable constraints); for example, it is possible to migrate one ore more software programs to other servers, to change the profile of the active virtual appliance or to stop it. Corresponding information is saved into an update list. A test is then made at block 434 to verify whether a last active virtual appliance has been processed. If not, the flow of activity returns to the block 426 to reiterate the same operations on a next active virtual appliance. Conversely, once all the active virtual appliances have been processed, another test is made at block 436 to verify whether a last profile of the specific virtual appliance has been processed. If not, the flow of activity returns to the block 424 to reiterate the same operations on a next profile of the specific virtual appliance. Conversely, once all the profiles of the specific virtual appliance have been processed, the flow of activity descends into block 438; in this phase, all the eligible options that are available to make all the software programs of each profile of the specific virtual appliance compliant with the applicable constraints are determined from the update list. Continuing to block 440, the value of a cost function (for example, as described in US-A-2009/0249329) is calculated for each eligible option. The cost function has a set of independent variables that represent the status of the cloud infrastructure and a dependent variable that represents its value, which is defined according to the license conditions (from the constraint information) so as to indicate a charge associated with the status of the cloud infrastructure; in this specific case, the cost function is evaluated by assigning its independent variables according to the status of the cloud infrastructure corresponding to the eligible option so as to indicate the charge associated with it. For each eligible option, the cost function is also optimized at block 442 (with standard operative research techniques). This operation is aimed at determining the values of its independent variables that minimize its value, at the same maintaining the compliance with the applicable constraints; the values of the independent variables so obtained define a status of the cloud infrastructure with the same profiles of its virtual appliances, which provides the lowest charge that may be associated with the eligible option (for example, by migrating some software programs to other servers). The eligible options so optimized (together with their charges), are then submitted to a cloud administrator at block 443 for his/her choice (for example, by displaying them on a monitor). The flow of activity branches at block 444 according to the choice of the cloud administrator. If the cloud administrator does not accept any one of the eligible options (for example, because s/he does not want to change the profiles of the specific virtual appliance and/or of the active virtual appliances), the flow of activity returns to a waiting condition at the block 404 (in the case of the deployment of the new virtual appliance) or at the block 414 (in the case of the verification of the active virtual appliance). Conversely, a configuration scheme corresponding to the eligible option that has been accepted by the cloud administrator is determined at block 446. The configuration scheme indicates the profile that has been chosen for the specific virtual appliance, again referred to as specific profile (either the same of the selected/active profile or different from it), and any update required to the specific/active virtual appliances; for each one of the involved virtual machines of these specific/active virtual appliances, the configuration scheme also indicates its characteristics (for example, hosting server and assigned virtual resources). Particularly, in this way it is possible to allow the use of the specific virtual appliance (which would not be compliant with the applicable constraints) with a different profile (for example, by replacing a proprietary software program that cannot be used with a corresponding open source software program); in addition or in alternative, the same result may also be achieved by updating one or more of the other active virtual appliances (for example, by forcing them to use different profiles as well). In both cases, it is possible to update the corresponding virtual machines (either to make the specific virtual appliance compliant with the applicable constraints or to minimize the corresponding charge).

Referring back to the block 422, when all the software programs of the specific profile are compliant with the applicable constraints the flow of activity descends into block 448; in this phase, the cost function corresponding to the specific profile is optimized as above (in order to determine a status of the cloud infrastructure with the same profiles of its virtual appliances, which provides the lowest charge that may be associated with the specific profile). Likewise, the configuration scheme corresponding to the specific profile so optimized (i.e., the characteristics of the involved virtual machines of the specific virtual appliance and of the active virtual appliances) is determined at block 450.

The flow of activity merges again at block 452, from either the block 446 or the block 450. At this point, a test is made to verify whether the configuration scheme involves any change to the other active virtual appliances. If so, each one of these active virtual machines is re-configured at block 454. For example, this may involve the migration of the active virtual appliance to a different profile (by injecting the corresponding migration scripts into the involved virtual machines, turning them off and on so as to cause the automatic execution of these migration scripts); in addition or in alternative, this may involve moving one or more of its virtual machines to other servers and/or changing their virtual resources. The status information is updated accordingly at block 456. The flow of activity then continues to block 458; the same point is also reached directly from the block 452 when the configuration scheme does not involve any change to the other active virtual appliances.

At this point, if the above-described operations have been triggered by the request of deploying a new virtual appliance as determined in block 458, this new virtual appliance is deployed at block 460 according to the configuration scheme. Particularly, this involves the creation of its virtual machines on the servers indicated in the configuration scheme; for each virtual machine, the software programs corresponding to the specific profile indicated in the configuration scheme are enabled (for example, by injecting the corresponding activation scripts into the involved virtual machines, so as to cause their automatic execution at the turn on of these virtual machines). The status information is updated accordingly at block 462. The flow of activity then returns to the block 404 waiting for the request of deploying a further new virtual appliance.

Referring back to the block 458, if the above-described operations have instead been triggered by the request of verifying an active virtual appliance, a test is made at block 464 to verify whether this active virtual appliance is to be updated according to the configuration scheme. If so, the active virtual machine is re-configured at block 466 as above (for example, by migrating it to a different profile and/or moving one or more of its virtual machines to other servers or changing their virtual resources). The status information is updated accordingly at block 468. The flow of activity then returns to the block 414 waiting for the request of verifying a further active virtual appliance.

Naturally, in order to satisfy local and specific requirements, a person skilled in the art may apply many logical and/or physical modifications and alterations to the present disclosure. More specifically, although this disclosure has been described with a certain degree of particularity with reference to one or more embodiments thereof, it should be understood that various omissions, substitutions and changes in the form and details as well as other embodiments are possible. Particularly, different embodiments of the present disclosure may even be practiced without the specific details (such as the numerical values) set forth in the preceding description to provide a more thorough understanding thereof; conversely, well-known features may have been omitted or simplified in order not to obscure the description with unnecessary particulars. Moreover, it is expressly intended that specific elements and/or method steps described in connection with any embodiment of the present disclosure may be incorporated in any other embodiment as a matter of general design choice. In any case, ordinal or other qualifiers are merely used as labels to distinguish elements with the same name but do not by themselves connote any priority, precedence or order. Moreover, the terms include, comprise, have, contain and involve (and any forms thereof) should be intended with an open, non-exhaustive meaning (i.e., not limited to the recited items), the terms based on, dependent on, according to, function of (and any forms thereof) should be intended as a non-exclusive relationship (i.e., with possible further variables involved), and the term a/an should be intended as one or more items (unless expressly indicated otherwise).

For example, an embodiment provides a method for managing one or more virtual appliances on a computing system. Each virtual appliance comprises one or more virtual machines (each one comprising one or more software programs) and supports a plurality of profiles (each one involving an enabling of a corresponding set of one or more of the software programs with each other software program that is disabled). For at least a specific one of the virtual appliances the method comprises the following steps. Profile information indicative of the profiles of the specific virtual appliance is retrieved. Status information indicative of a status of the computing system is retrieved. Constraint information indicative of one or more constraints applicable to the software programs of the specific virtual appliance on the computing system is retrieved. A configuration scheme of the specific virtual appliance is determined according to the profile information, the status information and the constraint information; the configuration scheme involves a specific one of the profiles of the specific virtual appliance that has the software programs thereof compliant with the applicable constraints. The specific virtual appliance is configured according to the configuration scheme.

However, the same method may be applied to the management of any type of virtual appliance (for example, conforming to another format, such as the VMDK), in the broadest meaning of the term (down to the software image of a single virtual machine); the virtual appliances may be managed on any other computing system (see below). Each virtual appliance may comprise any number and type of virtual machines (each one comprising any number and type of software programs); moreover, it may support any number (two or more) of profiles (each one involving the enabling of any number of software programs, either operating systems or application programs, from a single one to all the available ones), which profiles may be defined in any way (for example, at the level of each virtual machine or globally for all of them). The profile information may be of any type (for example, with or without specific customizations of the enabled software programs) and it may be retrieved in any way (for example, always discovering it at run-time from any suitable source, such as a local or remote data-base). The status information may be of any type (see below) and it may be retrieved in any way (for example, maintained according to the deploy and deletion of the virtual appliances). The constraint information may be of any type (see below) and it may be retrieved in any way (for example, from EulaSection elements of the deployment descriptor of the specific virtual appliance). The configuration scheme may be of any type (for example, down to indicate the specific profile to be activated only but without any indication about the characteristics of the corresponding virtual machines or without the possibility of changing the profile of the specific virtual appliance) and it may be determined in any way (see below); particularly, the specific profile may be determined to have its software programs compliant with the applicable constraints in any way (for example, by accepting a certain degree of non-compliance temporarily). The specific virtual appliance may be configured in any way according to the configuration scheme (for example, directly invoking APIs of the hypervisors hosting the corresponding virtual machines).

In an embodiment, in response to none of the profiles of the specific virtual appliance having the software programs thereof compliant with the applicable constraints, said determining a configuration scheme comprises the following steps (for at least a further specific one of the virtual appliances already instantiated on the computing system). Further profile information indicative of the profiles of the further specific virtual appliance is retrieved. Further constraint information indicative of one or more further constraints applicable to the software programs of the further specific virtual appliance on the computing system is retrieved. A further configuration scheme of the further specific virtual appliance is determined according to the further profile information, the status information and the further constraint information; the further configuration scheme involves a further specific one of the profiles of the further specific virtual appliance having the software programs thereof compliant with the applicable further constraints. These steps are repeated until at least one of the profiles of the specific virtual appliance has the software programs thereof compliant with the applicable constraints. The method further comprises re-configuring the further specific virtual appliance according to the further configuration information.

However, the above-mentioned steps may be performed for any number of further specific virtual appliances (for example, only for the ones allowing the change of their profiles). Moreover, similar considerations as above apply to the retrieval of the further profile information and the further constraint information; in any case, nothing prevents retrieving the information about the profiles and the constraints of all the virtual appliances together. Similar considerations as above also apply to the determination of the further configuration scheme and to the re-configuration of the further specific virtual appliance. The stopping condition for the repetition of the above-mentioned steps may be of any type, even automatic without requiring any manual intervention (for example, as soon as an eligible option has been found that makes all the software programs of the specific virtual appliance compliant with the applicable constraints). However, a basic implementation wherein only the specific virtual appliance is configured (without any possibility of updating the other virtual appliances that are already instantiated on the computing system) is contemplated; alternatively, any other action may be performed when none of the profiles of the specific virtual appliance has the software programs thereof compliant with the applicable constraints (for example, issuing a warning message suggesting possible actions to be taken manually for solving the problem).

In an embodiment, the specific virtual appliance is a new virtual appliance to be deployed on the computing system; said configuring the specific virtual appliance comprises deploying the new virtual appliance onto the computing system according to the configuration scheme.

However, the new virtual appliance may be deployed in any way according to the configuration scheme (for example, by configuring its virtual machines with dedicated commands after their turn on).

In an embodiment, the specific virtual appliance is each active virtual appliance already instantiated on the computing system; said configuring the specific virtual appliance comprises updating the active virtual appliance according to the configuration scheme when necessary.

However, the update of the active virtual appliances may be performed in any way (for example, as above with dedicated commands sent to the impacted virtual machines without turning them off).

In an embodiment, said retrieving profile information, retrieving status information, retrieving constraint information, determining a configuration scheme, and configuring the specific virtual appliance are performed periodically for each active virtual appliance.

However, these operations may be performed with any periodicity (either the same for all the active virtual appliances or different one to another, for example, measured from the corresponding deployments); in any case, the same steps may be performed in response to a corresponding command (for one or more selected active virtual appliances or for all of them).

In an embodiment, the status information comprises an indication of one or more computing machines of the computing system, of each virtual machine hosted on each computing machine and of each software program enabled on each virtual machine.

However, the status information may be defined in any way (for example, in terms of the active profiles of the active virtual appliances) and/or it may comprise different, additional or alternative pieces of information (for example, information about the physical resources of the servers, the virtual resources allocated to the virtual machines).

In an embodiment, the constraint information comprises an indication of usage entitlements available in the computing system for the software programs of the virtual appliances.

However, the usage entitlements may be of any type (for example, based on the maximum amount of physical/virtual computational power of the virtual machines where the software programs run).

In an embodiment, the constraint information comprises an indication of service levels required to services implemented on the computing system by the virtual appliances.

However, the service levels may be of any type (for example, any value—such as peak or average value—of any metric(s)—such as bandwidth, availability).

In any case, the constraint information may comprise different, additional or alternative pieces of information (for example, only the usage entitlements, only the service levels, both of them or further information, such as company policies).

In an embodiment, the constraint information comprises an indication of usage conditions of the software programs of the virtual appliances on the computing system; said determining a configuration scheme of the specific virtual appliance comprises optimizing a cost function based on the usage conditions.

However, the usage conditions may be of any type (for example, with license conditions based on the amount of available physical/virtual computational power); likewise, the optimization of the configuration scheme may be performed in any way, even without the definition of any cost function (for example, by leveraging neural network techniques).

In an embodiment, said determining a configuration scheme of the specific virtual appliance comprises evaluating the cost function for each one of a plurality of eligible options (each one defined by an eligible configuration scheme of the specific virtual appliance and/or an eligible further configuration scheme of said at least one further specific virtual appliance) and selecting one of the eligible options according to the evaluations of the cost function.

However, the eligible options may be defined in any (for example, only by corresponding eligible configuration schemes) and they may be selected in any way (for example, automatically).

In an embodiment, the computing system is a cloud computing infrastructure.

However, the same method may be applied to any other computing system (for example, a client/server architecture).

Generally, similar considerations apply if the same solution is implemented with an equivalent method (by using similar steps with the same functions of more steps or portions thereof, removing some steps being non-essential, or adding further optional steps); moreover, the steps may be performed in a different order, concurrently or in an interleaved way (at least in part).

A further embodiment provides a computer program configured for causing a computing system to perform the steps of the above-described method when the computer program is executed on the computing system.

A further embodiment provides a computer program product comprising a non-transitory computer readable medium embodying a computer program, the computer program being loadable into a working memory of a computing system thereby configuring the computing system to perform the same method.

However, the above-described solution may be implemented as a stand-alone software program, as a plug-in for a pre-existing software program (such as a cloud provisioning manager), or even directly in it. As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. A computer readable signal medium may include a propagated data signal with computer readable program code embodied therein, for example, in base-band or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc, or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the relevant computer, as a stand-alone software package, partly on this computer and partly on a remote computer or entirely on the remote computer. In the latter scenario, the remote computer may be connected to the computer through any type of network, including a local area network (LAN) or a wide area network (WAN), or the connection may be made to an external computer (for example, through the Internet using an Internet Service Provider). Aspects of the present invention have been described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

A further embodiment provides a system comprising means configured for performing the steps of the above-described method.

However, the method may also be carried out on a system based on a different architecture (for example, a local, wide area, global, cellular or satellite network), and exploiting any type of (wired and/or wireless) connections. However, its implementation on a stand-alone computing machine is not excluded. Each computing machine may have another structure or may comprise similar elements; moreover, it is possible to replace the computing machine with any code execution entity, either based on a physical machine or a virtual machine (such as a PDA, a mobile phone, and the like), or with a combination of multiple entities (such as a multi-tier architecture, a grid computing infrastructure, and the like).

Generally, similar considerations apply if the system has a different structure or comprises equivalent components, or it has other operative characteristics. In any case, every component thereof may be separated into more elements, or two or more components may be combined together into a single element; moreover, each component may be replicated to support the execution of the corresponding operations in parallel. Moreover, unless specified otherwise, any interaction between different components generally does not need to be continuous, and it may be either direct or indirect through one or more intermediaries.

The invention claimed is:

1. A method for managing one or more virtual appliances on a computing system, each virtual appliance of the one or more virtual appliances comprising one or more virtual machines, each virtual machine of the one or more virtual machines comprising one or more software programs and supporting a plurality of profiles, each profile in the plurality of profiles involving an enabling of a corresponding set of the one or more of the software programs with each other software program of the one or more of the software programs being disabled for the one or more virtual appliance and the one or more virtual machines hosted by the virtual appliances, wherein, for at least a specific virtual appliance of the one or more virtual appliances, the method comprises:

retrieving profile information indicative of a set of profiles of the specific virtual appliance;

retrieving status information indicative of a status of the computing system, wherein the status information comprises an indication: of one or more computing machines of the computing system, of each virtual machine hosted on each computing machine, and of each software program enabled on each virtual machine;

retrieving constraint information indicative of one or more constraints applicable to the one or more software programs of the specific virtual appliance on the computing system, wherein the constraint information comprises an indication of usage entitlements available in the computing system for the one or more software programs of the specific virtual appliances;

determining a configuration scheme of the specific virtual appliance according to the profile information, the status information, and the constraint information, the configuration scheme involving a specific profile of the set of profiles of the specific virtual appliance having the one or more software programs thereof compliant with the one or more constraints applicable to the one or more software programs of the specific virtual appliance on the computing system, wherein the specific profile to have the one or more software programs of the specific virtual appliance compliant with the one or more constraints causes enabling a set of the one or more software programs and disabling others of the one or more software programs for the specific virtual appliance and the one or more virtual machines hosted by the specific virtual appliance; and configuring the specific virtual appliance according to the configuration scheme.

2. The method according to claim 1, wherein, in response to none of the set of profiles of the specific virtual appliance having the software programs thereof compliant with the one or more constraints applicable to the one or more software programs of the specific virtual appliance on the computing system, the determining of the configuration scheme comprises, for at least a further specific virtual appliance of the one or more virtual appliances already instantiated on the computing system:

retrieving further profile information indicative of the set of profiles of the further specific virtual appliance;

retrieving further constraint information indicative of one or more further constraints applicable to the one or more software programs of the further specific virtual appliance on the computing system, wherein the further constraint information comprises an indication of usage entitlements available in the computing system or the one or more software programs of the further specific virtual appliances;

determining a further configuration scheme of the further specific virtual appliance according to the further profile information, the status information and the further constraint information, the further configuration scheme involving a further specific profile of the set of profiles of the further specific virtual appliance having the one or more software programs thereof compliant with the one or more further constraints applicable to the one or more software programs of the further specific virtual appliance on the computing system, wherein the further specific profile to have the one or more software programs of the further specific virtual appliance compliant with the one or more further constraints causes enabling a set of the one or more software programs and disabling others of the one or more software programs for the further specific virtual appliance and the one or more virtual machines hosted by the further specific virtual appliance; and until at least profile of the set of profiles of the specific virtual appliance has the software programs thereof compliant with the one or more constraints applicable to the one or more software programs of the specific virtual appliance on the computing system, the method further comprising:

re-configuring the further specific virtual appliance according to the further configuration scheme.

3. The method according to claim 1, wherein the specific virtual appliance is a new virtual appliance to be deployed on the computing system, the configuring the specific virtual appliance according to the configuration scheme comprising:

deploying the new virtual appliance onto the computing system according to the configuration scheme.

4. The method according to claim 1, wherein the specific virtual appliance is each active virtual appliance already instantiated on the computing system, the configuring the specific virtual appliance according to the configuration scheme comprising:

updating the active virtual appliance according to the configuration scheme when necessary.

5. The method according to claim 4, wherein the retrieving of the profile information, the retrieving of the status information, the retrieving of the constraint information, the determining of the configuration scheme, and the configuring of the specific virtual appliance are performed periodically for each active virtual appliance.

6. The method according to claim 1, wherein the constraint information comprises an indication of service levels required to services implemented on the computing system by the one or more virtual appliances.

7. The method according to claim 1, wherein the constraint information comprises an indication of usage conditions of the one or more software programs of the one or more virtual appliances on the computing system, the determining of the configuration scheme of the specific virtual appliance comprising:
    optimizing a cost function based on the usage conditions.

8. The method according to claim 7, wherein the determining of the configuration scheme of the specific virtual appliance comprises:
    evaluating the cost function for each eligible option of a plurality of eligible options each eligible option defined by an eligible configuration scheme of the specific virtual appliance or an eligible further configuration scheme of at least one further specific virtual appliance, and
    selecting an eligible option of the plurality of eligible options according to the evaluations of the cost function.

9. A computer program product comprising a non-transitory computer readable storage medium having a computer readable program stored therein, wherein the computer readable program, when executed on a computing device, causes the computing device to:
    retrieve profile information indicative of a set of profiles of a specific virtual appliance, wherein the specific virtual appliance is a virtual appliance of one or more virtual appliances on the computing device, each virtual appliance of the one or more virtual appliances comprising one or more virtual machines, each virtual machine of the one or more virtual machines comprising one or more software programs and supporting a plurality of profiles, and each profile in the plurality of profiles involving an enabling of a corresponding set of the one or more of the software programs with each other software program of the one or more of the software programs being disabled for the one or more virtual appliance and the one or more virtual machines hosted by the virtual appliance;
    retrieve status information indicative of a status of the computing system, wherein the status information comprises an indication: of one or more computing machines of the computing system, of each virtual machine hosted on each computing machine, and of each software program enabled on each virtual machine;
    retrieve constraint information indicative of one or more constraints applicable to the one or more software programs of the specific virtual appliance on the computing system, wherein the constraint information courses an indication of usage entitlements available in the computing system for the one or more software programs of the specific virtual appliances;
    determine a configuration scheme of the specific virtual appliance according to the profile information, the status information, and the constraint information, the configuration scheme involving a specific profile of the set of profiles of the specific virtual appliance having the one or more software programs thereof compliant with the one or more constraints applicable to the one or more software programs of the specific virtual appliance on the computing system, wherein the specific profile to have the one or more software programs of the specific virtual appliance compliant with the one or more constraints causes enabling a set of the one or more software programs and disabling others of the one or more software programs for the specific virtual appliance and the one or more virtual machines hosted by the specific virtual appliance; and
    configure the specific virtual appliance according to the configuration scheme.

10. The computer program product according to claim 9, wherein, in response to none of the set of profiles of the specific virtual appliance having the software programs thereof compliant with the one or more constraints applicable to the one or more software programs of the specific virtual appliance on the computing system, the computer readable program for determining the configuration scheme further causes the computing device to:
    retrieve further profile information indicative of the set of profiles of a further specific virtual appliance;
    retrieve further constraint information indicative of one or more further constraints applicable to the one or more software programs of the further specific virtual appliance on the computing system, wherein the further constraint information comprises an indication of usage entitlements available in the computing system for the one or more software programs of the further specific virtual appliances;
    determine a further configuration scheme of the further specific virtual appliance according to the further profile information, the status information and the further constraint information, the further configuration scheme involving a further specific profile of the set of profiles of the further specific virtual appliance having the one or more software programs thereof compliant with the one or more further constraints applicable to the one or more software programs of the further specific virtual appliance on the computing system, wherein the further specific profile to have the one or more software programs of the further specific virtual appliance compliant with the one or more further constraints causes enabling a set of the one or more software programs and disabling others of the one or more software programs for the further specific virtual appliance and the one or more virtual machines hosted by the further specific virtual appliance; and
    until at least profile of the set of profiles of the specific virtual appliance has the software programs thereof compliant with the one or more constraints applicable to the one or more software programs of the specific virtual appliance on the computing system, the computer readable program further causing the computing device to:
    re-configure the further specific virtual appliance according to the further configuration scheme.

11. The computer program product according to claim 9, wherein the specific virtual appliance is a new virtual appliance to be deployed on the computing system and wherein the computer readable program to configure the specific virtual appliance according to the configuration scheme further causes the computing device to:
    deploy the new virtual appliance onto the computing system according to the configuration scheme.

12. The computer program product according to claim 9, wherein the specific virtual appliance is each active virtual appliance already instantiated on the computing system and wherein the computer readable program to configure the specific virtual appliance according to the configuration scheme further causes the computing device to:
    update the active virtual appliance according to the configuration scheme when necessary.

13. The computer program product according to claim 9, wherein the computer readable program to determine of the configuration scheme of the specific virtual appliance further causes the computing device to:
    evaluate the cost function for each eligible option of a plurality of eligible options each eligible option defined by an eligible configuration scheme of the specific virtual appliance or an eligible further configuration scheme of at least one further specific virtual appliance; and
    select an eligible option of the plurality of eligible options according to the evaluations of the cost function.

14. An apparatus comprising:
    a processor; and
    a memory coupled to the processor, wherein the memory comprises instructions which, when executed by the processor, cause the processor to:
    retrieve profile information indicative of a set of profiles of a specific virtual appliance, wherein the specific virtual appliance is a virtual appliance of one or more virtual appliances on the computing device, each virtual appliance of the one or more virtual appliances comprising one or more virtual machines, each virtual machine of the one or more virtual machines comprising one or more software programs and supporting a plurality of profiles, and each profile in the plurality of profiles involving an enabling of a corresponding set of the one or more of the software programs with each other software program of the one or more of the software programs being disabled for the one or more virtual appliance and the one or more virtual machines hosted by the virtual appliance;
    retrieve status information indicative of a status of the computing system, wherein the status information comprises an indication: of one or more computing machines of the computing system, of each virtual machine hosted on each computing machine, and of each software program enabled on each virtual machine;
    retrieve constraint information indicative of one or more constraints applicable to the one or more software programs of the specific virtual appliance on the computing system, wherein the constraint information comprises an indication of usage entitlements available in the computing system for the one or more software programs of the specific virtual appliances;
    determine a configuration scheme of the specific virtual appliance according to the profile information, the status information, and the constraint information, the configuration scheme involving a specific profile of the set of profiles of the specific virtual appliance having the one or more software programs thereof compliant with the one or more constraints applicable to the one or more software programs of the specific virtual appliance on the computing system, wherein the specific profile to have the one or more software programs of the specific virtual appliance compliant with the one or more constraints causes enabling a set of the one or more software programs and disabling others of the one or more software programs for the specific virtual appliance and the one or more virtual machines hosted by the specific virtual appliance; and
    configure the specific virtual appliance according to the configuration scheme.

15. The apparatus according to claim 14, wherein, in response to none of the set of profiles of the specific virtual appliance having the software programs thereof compliant with the one or more constraints applicable to the one or more software programs of the specific virtual appliance on the computing system, the instructions for determining the configuration scheme further cause the processor to:
    retrieve further profile information indicative of the set of profiles of a further specific virtual appliance;
    retrieve further constraint information indicative of one or more further constraints applicable to the one or more software programs of the further specific virtual appliance on the computing system, wherein the further constraint information comprises an indication of usage entitlements available in the computing system for the one or more software programs of the further specific virtual appliances;
    determine a further configuration scheme of the further specific virtual appliance according to the further profile information, the status information and the further constraint information, the further configuration scheme involving a further specific profile of the set of profiles of the further specific virtual appliance having the one or more software programs thereof compliant with the one or more further constraints applicable to the one or more software programs of the further specific virtual appliance on the computing system, wherein the further specific profile to have the one or more software programs of the further specific virtual appliance compliant with the one or more further constraints causes enabling a set of the one or more software programs and disabling others of the one or more software programs for the further specific virtual appliance and the one or more virtual machines hosted by the further specific virtual appliance; and
    until at least profile of the set of profiles of the specific virtual appliance has the software programs thereof compliant with the one or more constraints applicable to the one or more software programs of the specific virtual appliance on the computing system, the computer readable program further causing the computing device to:
    re-configure the further specific virtual appliance according to the further configuration scheme.

16. The apparatus according to claim 14, wherein the specific virtual appliance is a new virtual appliance to be deployed on the computing system and wherein the instructions to configure the specific virtual appliance according to the configuration scheme further cause the processor to:
    deploy the new virtual appliance onto the computing system according to the configuration scheme.

17. The apparatus according to claim 14, wherein the specific virtual appliance is each active virtual appliance already instantiated on the computing system and wherein the instructions to configure the specific virtual appliance according to the configuration scheme further cause the processor to:
    update the active virtual appliance according to the configuration scheme when necessary.

18. The apparatus according to claim 14, wherein the instructions to determine of the configuration scheme of the specific virtual appliance further cause the processor to:

evaluate the cost function for each eligible option of a plurality of eligible options each eligible option defined by an eligible configuration scheme of the specific virtual appliance or an eligible further configuration scheme of at least one further specific virtual appliance; and select an eligible option of the plurality of eligible options according to the evaluations of the cost function.

\* \* \* \* \*